(12) United States Patent
Wobben

(10) Patent No.: US 6,799,947 B2
(45) Date of Patent: Oct. 5, 2004

(54) BEARING FOR AN ADJUSTABLE ROTOR BLADE ON A WIND ENERGY PLANT

(76) Inventor: Aloys Wobben, Argestrasse 19, Aurich (DE), 26607

( * ) Notice: Subject to any disclaimer, the term of this patent is extended or adjusted under 35 U.S.C. 154(b) by 118 days.

(21) Appl. No.: 10/220,950
(22) PCT Filed: Feb. 22, 2001
(86) PCT No.: PCT/EP01/02008
§ 371 (c)(1), (2), (4) Date: Dec. 17, 2002
(87) PCT Pub. No.: WO01/69081
PCT Pub. Date: Sep. 20, 2001

(65) Prior Publication Data
US 2003/0147751 A1 Aug. 7, 2003

(30) Foreign Application Priority Data
Mar. 10, 2000 (DE) .......................................... 100 11 464

(51) Int. Cl.[7] ................................................ F03D 3/06
(52) U.S. Cl. ........................................ 416/174; 416/205
(58) Field of Search ............................ 416/174, 204 R, 416/205, 209; 384/461, 609, 613

(56) References Cited

U.S. PATENT DOCUMENTS

| | | | |
|---|---|---|---|
| 2,488,825 A | 11/1949 | Palumbo | |
| 3,304,137 A | 2/1967 | Strassberg | |
| 4,126,361 A | 11/1978 | Böttner et al. | |

FOREIGN PATENT DOCUMENTS

| | | |
|---|---|---|
| DE | 21549 | 7/1961 |
| DE | 1 129 117 | 5/1962 |
| DE | 1 976 014 | 12/1967 |
| DE | 1 425 038 | 12/1968 |
| DE | 25 52 526 | 5/1977 |
| DE | 27 52 487 | 2/1979 |
| DE | 44 32 986 | 11/1985 |
| DE | 40 00 830 C2 | 9/1992 |
| DE | 196 34 059 | 10/1997 |
| EP | 0 158 015 | 3/1986 |
| GB | 1069009 | 5/1967 |

OTHER PUBLICATIONS

Canadian Examination Report for Application No. 2,402,044, 2 pages (Jan. 16, 2003).
German Examination Report for Application No. 100 11 464.4, 3 pages (Jul. 4, 2000).

*Primary Examiner*—Edward K. Look
*Assistant Examiner*—Kimya N McCoy
(74) *Attorney, Agent, or Firm*—Merchant & Gould P.C.

(57) ABSTRACT

The mounting of an adjustable rotor blade on the rotor hub of a wind power installation has as an adjusting drive pivot bearing, a rolling bearing for the transmission of high axial forces and great flexural moments in the event of slight relative movements between the co-operating bearing components. It comprises a bearing race for the one co-operating bearing component, which receives in positively locking relationship two radially mutually displaced rows of rolling bodies, and a bearing race for the other co-operating bearing component, which embraces them in a U-shape in cross-section. The bearing race for the rotor blade forming the other co-operating bearing component comprises two races (10, 12) of different diameters, which are fixed independently of each other to the rotor blade (3). The circular root of the hollow rotor blade (3) is forked to form two shell portions (3a, 3b) and each shell portion is fixed to one of the two races (10, 12) of the one bearing race.

5 Claims, 3 Drawing Sheets

BEARING FOR AN ADJUSTABLE ROTOR BLADE ON A WIND ENERGY PLANT

Figure 1:
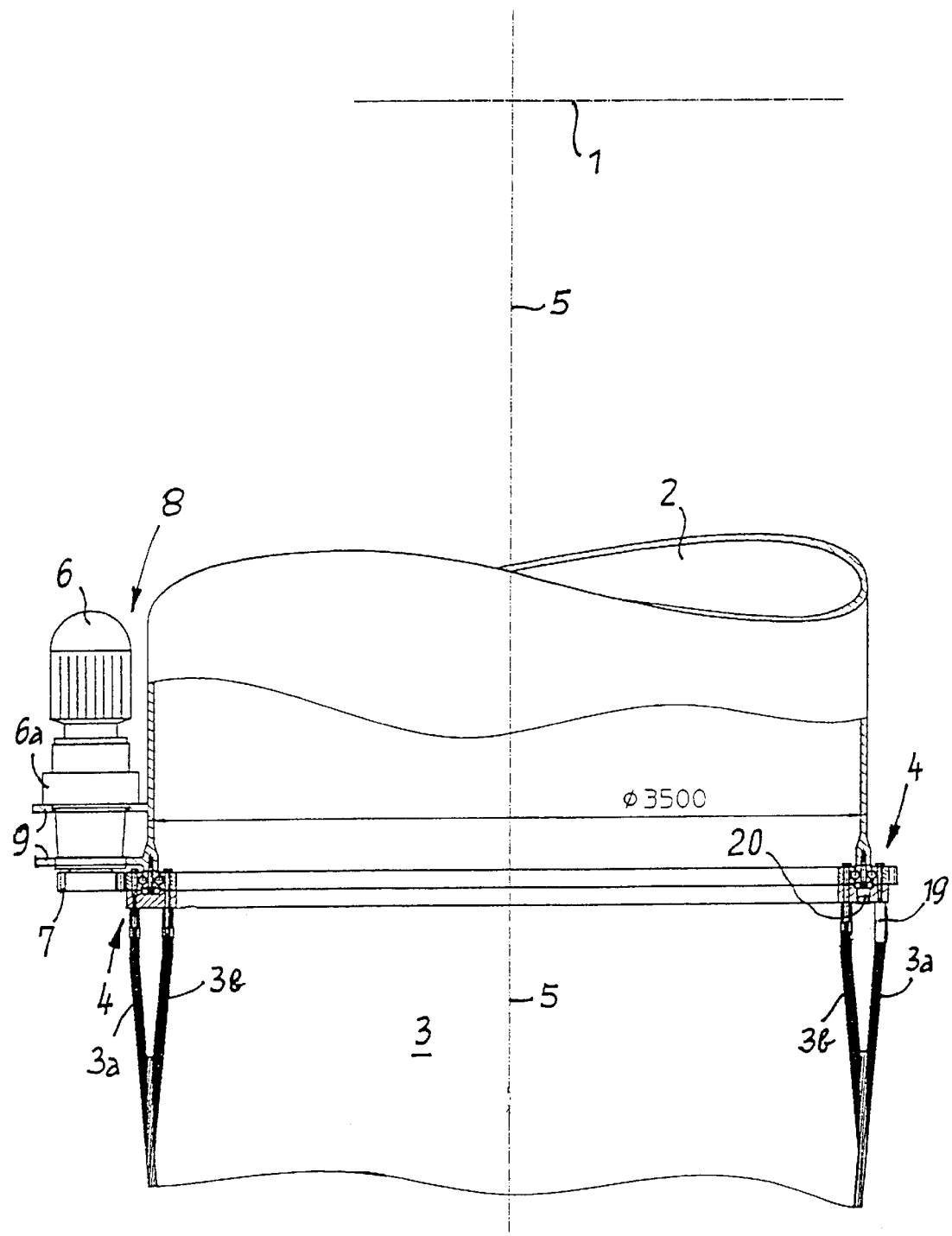

The invention concerns the mounting of an adjustable rotor blade on the rotor hub of a wind power installation with a rolling bearing for the transmission of high axial forces and large flexural moments with small relative movements between the co-operating bearing components in an adjusting drive pivot bearing between the rotor hub and a rotor blade of a wind power installation.

A ball-mounted rotary connection is known for excavators, rotary cranes or the like from DE 27 52 487 B1. As is known, the advantage of rolling bearings lies in the low level of (frictional) resistance which they oppose to the relative movement between the co-operating bearing components. That applies also and precisely in regard to pivot bearings as are used for example in adjusting drives, because there, in contrast to plain bearings, it is not necessary to overcome the static friction resistance—which is higher than the sliding friction—in each pivotal movement out of the rest position. On the other hand a multi-point bearing reacts substantially less sensitively than a plain bearing to high axial forces and in particular large flexural moments. The influence thereof becomes particularly serious if the rolling bearing must be of a large diameter and the flexural moments result in a radial relative displacement of the bearing races or rings. Thus, in the case of a ball bearing assembly, assuming an osculation of 6% (deviation of the raceway diameter from the ball diameter) the ball pressure angle in the raceway alters from 45° to 85° when the bearing races are radially displaced relative to each other by 0.56 mm; the balls are therefore only still rolling on the edges of the bearing races.

The variation in the pitch angle of the rotor blades of a wind power installation relative to the rotor hub thereof represents such an adjusting drive; as is known, for reasons of efficiency and safety, the pitch angle has to be altered in dependence on the respective wind speed during rotation of the rotor. DE 196 34 059 discloses a rotor blade mounting for a hollow rotor blade, the mounting comprising two ball bearings of the same diameter, which are displaced in the axial direction, wherein the common join line extends concentrically with respect to the axis of rotation so that radial forces can be carried well, but axial forces can be only limitedly carried. In operation however each rotor blade is subjected to considerable forces in the direction of its longitudinal axis—about which the rotor blade is pivoted upon adjustment of the pitch angle—and the rotor blade is also exposed to considerable flexural moments which the pivot mounting of the rotor blade on the rotor hub has to withstand, irrespective of frequent pivotal movements.

The object of the present invention is to provide a rotor blade mounting which satisfies that demand.

Based on the arrangement described in the opening part of this specification, that object is attained in a rolling bearing comprising a bearing race for the one co-operating bearing component, which bearing race receives in positively locking relationship two radially mutually displaced rows of rolling bodies, and a bearing race for the other co-operating bearing component, which embraces them in a U-shape in cross-section, wherein the bearing race for the rotor blade forming the other co-operating bearing component comprises two rings of different diameters which are fixed independently of each other to the rotor blade. That arrangement affords on the one hand a practically three-race rolling bearing whose central race which is secured to the other co-operating bearing component, upon the occurrence of flexural moments (and axial forces) receives from the two outer races (or race portions of the embracing bearing race) pressure forces in directions which extend more or less perpendicularly to each other and which are thereby automatically rendered symmetrical, and the pressure forces therefore respectively remain in the central region of the bearing raceway quadrants, while on the other hand the forces from the rotor blade are simultaneously applied to the two outer races (or race portions) and this therefore provides for more uniform loading of the mounting and the rotor blade root. The formation of the embracing bearing race from two outer races and a circular ring or race connecting them is known from EP 0 158 015 A2.

Preferably the circular root of the hollow rotor blade is forked in the form of two shell portions and each shell portion is fixed to one of the two races of the one bearing race. The two rows of rolling bodies are in particular arranged concentrically relative to each other. It is however also possible for them to be axially displaced.

Figure 2:
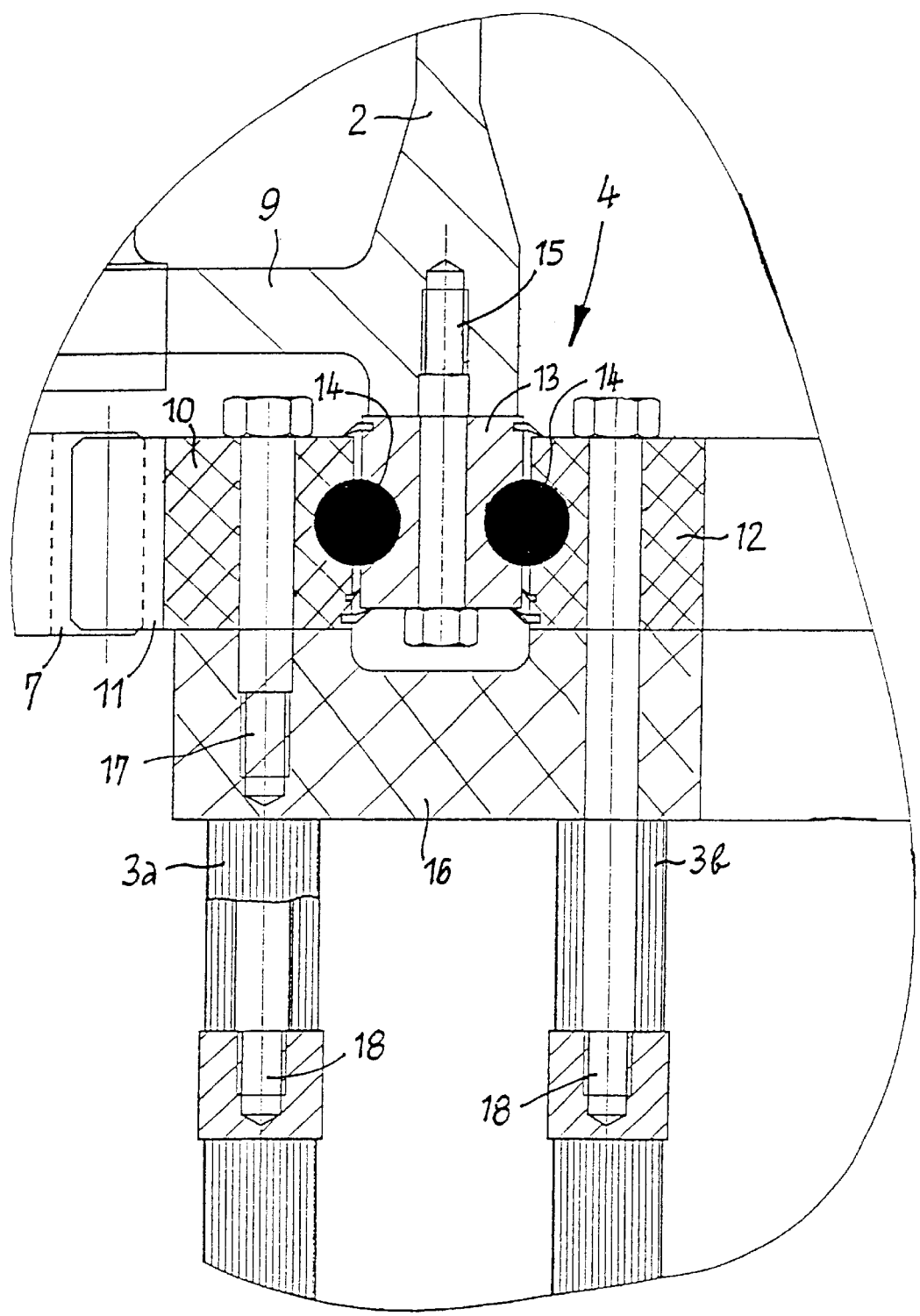
Figure 3:
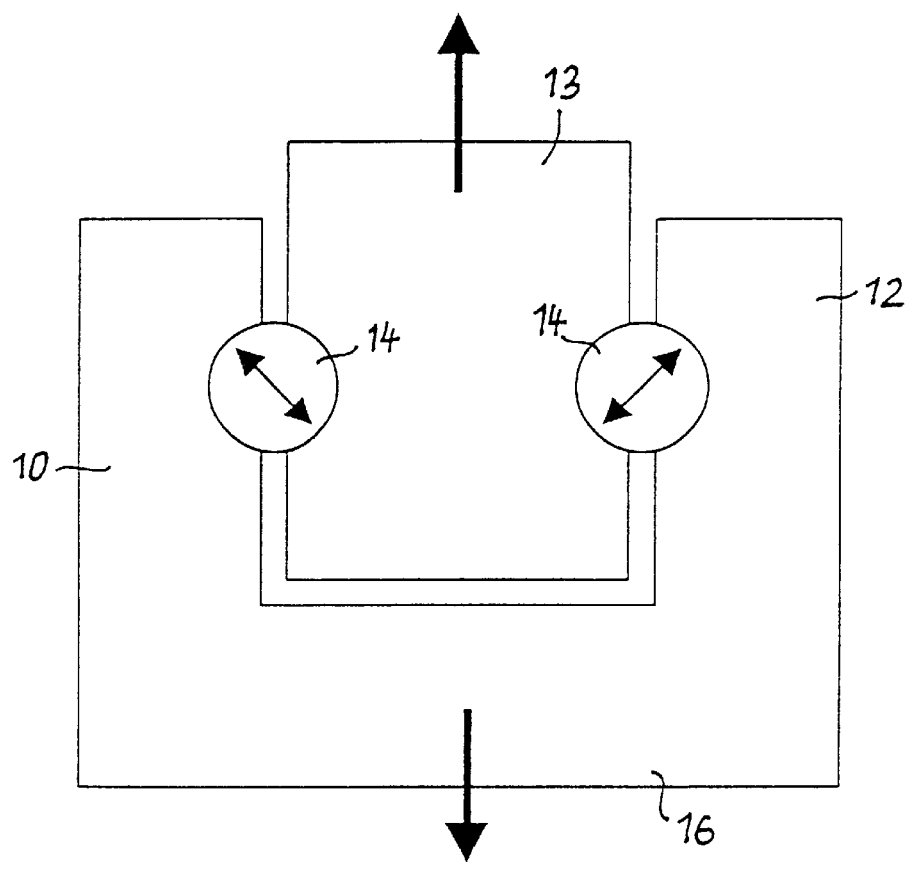

Additional developments will be apparent from the description of a specific embodiment hereinafter and are the subject-matter of further appendant claims. The drawing illustrates the embodiment, in which:

FIG. 1 is a partly sectional view illustrating the pivot mounting of a rotor blade of a wind power installation at the blade connection of the rotor hub, FIG. 2 is a view in section on a greatly enlarged scale showing the rolling bearing structure of the pivot bearing in FIG. 1, and FIG. 3 is a diagrammatic representation of the force conditions in the rolling bearing of FIG. 2.

The rotor hub (not shown) of a wind power installation is mounted at the tip of a mast (also not shown) which carries it, being rotatable about a horizontal rotor axis 1 which is indicated by dash-dotted lines in FIG. 1. Only the radially outer part of a rotor blade hub connection 2 is shown, a plurality thereof being mounted to the central part of the hub, uniformly distributed around the periphery thereof. The rotor blade hub connection 2 (which rotates with the rotor hub about the rotor axis 1) is substantially tubular with a diameter of 3.5 m in the illustrated example, corresponding to the circular 'root' of the rotor blade 3. The rotor blade 3 is mounted to the hub connection 2 pivotably by means of the bearing 4 about the longitudinal axis 5 of the rotor blade. The outer bearing ring or race 10 of the bearing 4 carries an external tooth arrangement 11 into which engages the pinion 7, which is driven by an electric motor 6, of an adjusting drive which is generally identified by reference numeral 8 (for adjustment of the rotor blade pitch angle). The motor 6 (together with transmission 6a) is fixed to a holding arrangement 9 fixedly connected to the hub connection 2.

The bearing 4 has a second bearing race 12 and a third bearing race 13 which is arranged between the bearing races 10, 12. Arranged between the bearing races 10 and 13 on the one hand and between the bearing races 12 and 13 on the other hand are rows of balls 14. The central bearing race 13 is screwed to the hub connection 2 by means of the screws 15. The bearing races 10 and 12 are screwed (screws 17 and 18 respectively) (always alternately in the peripheral direction) in part to a blade ring in the form of a circular ring 16 which terminates the hollow rotor blade 3 and in part—through the circular ring 16—directly to the rotor blade 3 itself. FIG. 1 clearly shows how the two shell portions 3a and 3b of the rotor blade 3 converge to form the single-shell rotor blade. The access opening 19 in conjunction with a bore 20 in the circular ring 16 permits access to the screws 15 of the bearing race 13 for the purposes of fitting and removal of the respective rotor blade 3.

The circular ring 16 which is fixed in the above-described manner both to the shell portion 3a and also to the shell portion 3b of the rotor blade 3 represents a rigid bridging means between the bearing races 10 and 12 so that this combination can be viewed in unitary manner as a bearing race of the rolling bearing 4.

FIG. 3 diagrammatically shows the forces occurring in operation of the pivot bearing 4 illustrated in FIGS. 1 and 2 for pitch angle adjustment of a rotor blade 3. As a consequence of the forces being symmetrically applied to and transmitted into the balls 14 of the two rows of the ball bearing assembly, the arrangement involves force arrows extending parallel to the axis 5 of the rotor blade, for the loading on the circular ring 16 (with the bearing races 10 and 12 illustrated as a unit therewith) and the bearing race 13.

What is claimed is:

1. An adjusting drive pivot mounting of an adjustable rotor blade on the rotor hub of a wind power installation with a rolling bearing for the transmission of high axial forces and great flexural moments with small relative movements between the co-operating bearing components, with a bearing race for the one co-operating bearing component, which receives in positively locking relationship two radially mutually displaced rows of rolling bodies, and a bearing race for the other co-operating bearing component, which embraces them in a U-shape in cross-section, wherein the bearing race for the rotor blade forming the other co-operating bearing component comprises two races (10, 12) of different diameters which are fixed independently of each other to the rotor blade (3).

2. A mounting as set forth in claim 1 characterized in that the circular root of the hollow rotor blade (3) is forked into two shell portions (3a, 3b) and each shell portion is fixed to one of the two races (10, 12) of the one bearing race.

3. A mounting as set forth in claim 1 characterized in that the two rows of rolling bearings are arranged concentrically relative to each other.

4. A mounting as set forth in one of claim 1 characterized in that the two races (10, 12) of the one bearing race are bridged by a circular ring (16) and each race (10, 12) is connected alternately over its periphery to the circular ring (16) and—through same—to the associated co-operating bearing component (rotor blade 3).

5. A mounting as set forth in one of claim 1 characterized in that the rolling bodies are balls (14).

* * * * *